ELECTRONIC OSCILLATOR CIRCUITS

Filed Feb. 7, 1951

INVENTOR
BENJAMIN S. VILKOMERSON
BY
ATTORNEY 2,729,766
Patented Jan. 3, 1956

2,729,766

ELECTRONIC OSCILLATOR CIRCUITS

Benjamin S. Vilkomerson, Camden, N. J., assignor to Radio Corporation of America, a corporation of Delaware Application February 7, 1951, Serial No. 209,737

9 Claims. (Cl. 315—27)

The present invention relates to improvements in electron oscillator circuits and more particularly, although not necessarily exclusively, to that type of electronic oscillator referred to as the resistance coupled multivibrator or relaxation oscillator.

In more particularity, the present invention relates to improvements in relaxation of multivibrator circuits of the waveform generating variety in which means are provided for controlling the frequency of the waveform generated.

The present invention, therefore, also relates to improvements in cathode ray beam deflection systems which employ multivibrator type waveform generators having means for controlling the frequency of developed signal waveforms.

In the electronic art it is often times convenient to use resistance coupled vacuum tube relaxation oscillators as a source of signal waveform. It is also required occasionally to provide a ready control of the signal frequency developed by the oscillator.

In the television art considerable use is made of the relaxation oscillator as a source of sawtooth cathode ray beam deflection signal. For example, it is commonplace to find that the vertical deflection circuits of modern day television receivers are comprised of a resistance coupled multivibrator or relaxation oscillator whose output is coupled to an electromagnetic deflection yoke surrounding the neck of a cathode ray beam kinescope. Some receiver designs have also utilized the resistance coupled oscillator or multivibrator as a source of horizontal sawtooth deflection signal.

One of the main defects, however, with the use of the resistance coupled relaxation oscillator or multivibrator as a source of deflection signal for cathode ray beam deflection, has been the tendency of the oscillator circuit to momentarily collapse whenever an attempt is made to change the frequency of oscillation and hence care must be taken in the synchronization of the oscillator by sync separated from received television signal. This phenomenon is well known in connection with the vertical deflection circuit of television receivers using the resistance coupled oscillator type of deflection generator. Such circuits are provided with a control known as the "hold control" by means of which the time constants of one or more RC networks in the vertical deflection circuit can be altered to change the frequency of the deflection waveform. It is the changing of this time constant value attendant with the consequent induction of a negative going voltage transient which momentarily blocks the circuit oscillation. Such deflection circuits are described in more detail in an article entitled—"Television Deflection Circuits," by A. W. Friend, appearing in the "RCA Review" for March 1947 and also in an article entitled "Deflection Circuits in Television Receivers" by E. W. Engstrom and R. S. Holmes, appearing in the January 1939 issue of "Electronics."

It is, therefore, an object of the present invention to provide a resistance coupled multivibrator or relaxation type oscillator in which the frequency of generated signal may be changed rather quickly without disabling the oscillator.

It is also an object of the present invention to provide an improved deflection circuit for cathode ray beam deflection particularly of the type required in television receivers.

It is another object of the present invention to provide an improvement which may be applied to existing cathode ray beam deflection circuits of the multivibrator variety so as to allow the frequency of deflection waveform developed to be quickly controlled without producing collapse or other disablement of the deflection action.

In the realization of the above objects and features of advantage, the present invention contemplates the use of a voltage sampling circuit connected within a conventional multivibrator circuit so as to sample changes in the operating potential of at least one of the vacuum tube operating electrodes and applying such voltage changes in an opposite polarity sense to other portions of the multivibrator circuit so as to at least partially compensate for such voltage change. More specifically, in the conventional two-tube resistance coupled multivibrator, in which the output of the first tube is connected to the input of the second tube, and the output of the second tube is connected to an input of the first tube, by resistance capacitance networks, the present invention contemplates the provision of an impedance path connecting the input circuits of the two tubes together. Should then rapid frequency control of the oscillation be attempted by controlling the time constant of the first tube input circuit the undesirable negative going transient appearing at the second tube is fed back to the first tube in a compensating phase so as to prevent momentary circuit collapse.

Additional objects and features of advantage as well as a more complete understanding of the nature and mode of operation of the present invention will be apparent from the following description especially when taken in connection with the accompanying drawings in which.

Figure 1:
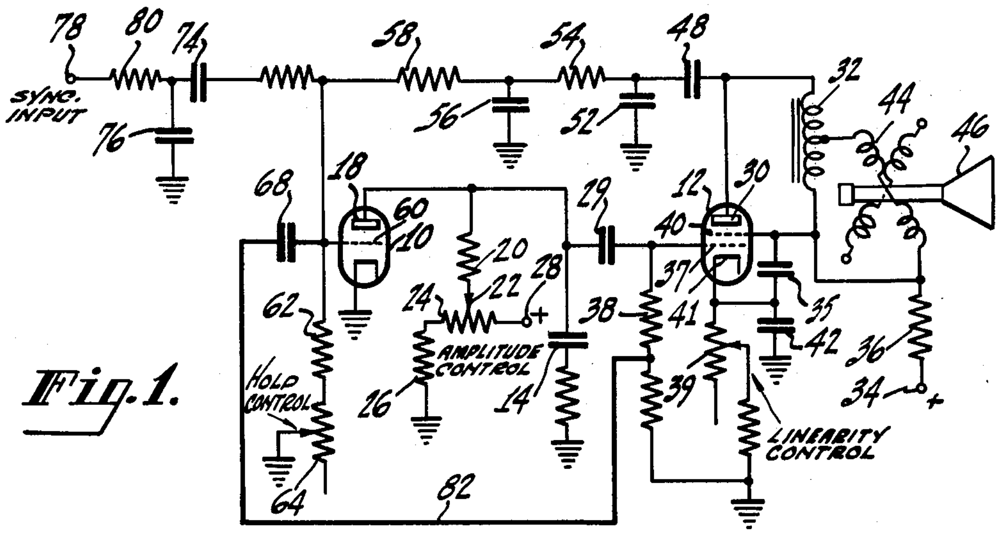
Figure 1 is a schematic representation of one form of the present invention as applied to a conventional cathode ray beam deflection circuit.
Figure 2:
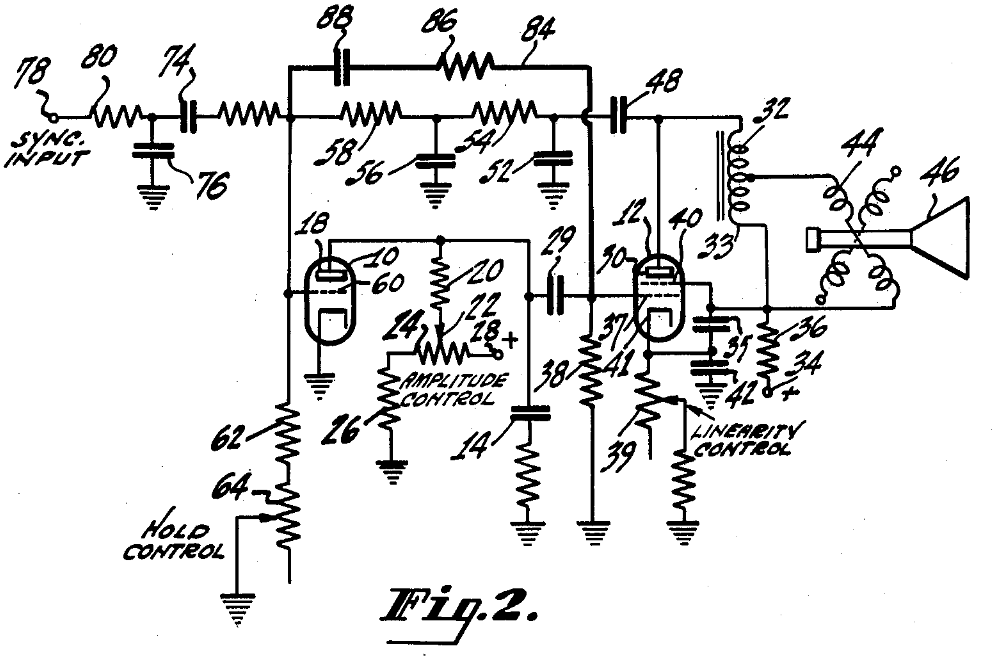
Figure 2 is a schematic representation of another form of the present invention as applied to the same type of deflection circuit shown in Figure 1.

Before considering in detail the exact mode of operation of the present invention, it is well to briefly consider the operation of the general form of multivibrator or relaxation oscillator upon which the conventional portions of the deflection circuit shown in Figures 1 and 2 are based. The general or broad form of sawtooth deflection circuit shown in the figures is disclosed in U. S. Patent 2,479,081, by W. J. Poch, issued August 16, 1949. The basic circuits of Figures 1 and 2 of the drawing are identical. The only difference between 1 and 2 being the particular form of the present invention shown in heavy lines.

The multivibrator deflection circuit is based upon discharge tubes 10 and 12. Discharge tube 10 is operated as a conventional sawtooth discharge generator, the sawtooth charging capacitor being shown at 14. Operating potential for the anode 18 of the discharge tube 10 is obtained through the sawtooth charging resistor 20 which in turn is connected to the tap 22 on potentiometer 24. Potentiometer 24 along with bleeder resistor 26 forms a direct-current voltage divider system across the power supply whose positive terminal is shown at 28. The potentiometer 24 and its tap 22 forms a well known form of deflection amplitude control. The second tube 12 acts as a deflection output amplifier driven by tube 10 via capacitor 29 and has its anode 30 connected with an auto transformer 32 whose lower extremity 33 is connected to positive power supply terminal 34 through decoupling resistor 36. The control electrode or grid 37 of tube 12 is returned to ground via resistors 38 and 39. Variable resistance means in the cathode circuit of the tube 12 provides a variable grid bias for the output stage and affords some degree of control over the linearity of the deflection waveform delivered by the tube 12. The potentiometer 39 therefore acts as a linearity control per se.

Still considering Figure 1, capacitor 35 maintains the screen electrode 40 of the output tube at substantially the same A. C. potential as the cathode, 41. Capacitor 42 is made rather large and reduces degeneration across the total cathode resistance. The deflection yoke 44 associated with the cathode ray kinescope 46 is connected in shunt with a portion of the auto transformer 32. Oscillation of the circuit and generation of sawtooth deflection waveform through the yoke 44, is caused by feed-back capacitor 48 connected with the anode 30 of tube 12. This capacitor 48 feeds back part of the output voltage, of the second tube 12 through the wave shaping network comprising the elements 52, 54, 56 and 58 to the control electrode 60 of the first tube 10. Control electrode 60 is given a ground return by means of resistors 62 and 64. The feedback path is positive in nature and permits sustained oscillation of the circuit.

Although the operation of the conventional deflection circuit thus far described is made clear by reference to the above cited publications and patent, a brief summary is given herewith for sake of expediency in more easily understanding of the nature of the present invention. As stated discharge tube 10 may be considered a sawtooth discharge tube. It will be assumed that the potential on the grid 60 of the tube 10 is (*a*) sufficiently negative to establish plate current cut-off in the tube 10 (*b*) that this negative voltage on the grid 60 was caused by present grid current and (*c*) that this is voltage stored on capacitors 48, 52, 56 and 68 and is slowly leaking off through the resistors 62 and 64. While the tube 10 is cut off capacitor 14 will begin to charge linearly through the charging resistor 20 and the rising portion of sawtooth waveform will be coupled to the input of tube 12 via capacitor 29. Soon the negative voltage on the grid 60 will leak off to a point allowing a slight amount of conduction in the tube 10. At this time sawtooth capacitor 14 will begin to discharge through the tube 10 and an abrupt current change through the inductance 32 will begin to take place. This current change through inductance 32 is in a direction so as to cause a positive pulse to appear at the plate 30 of tube 12. This positive pulse is coupled by capacitor 48 back to the grid 60 of tube 10, so as to render the tube 10 even more conductive. This, of course, is a regenerative action and results in a very rapid discharge of capacitor 14 to complete a sawtooth waveform. At the end of the discharge of capacitor 14 the positive pulse appearing at plate 30 will no longer exist and the grid current caused by the positive feedback pulse will have left the grid 60 again sufficiently negative to establish plate current cut-off in the tube 10. The sawtooth deflection cycle thus commences again.

From the foregoing description of operation, it will be seen that the frequency of oscillation will be inherently a function of the time it takes the negative cut-off voltage on the grid 60 of tube 10 to leak off and allow conduction in the tube. This length of time is in turn a function of the time constant of the capacitance and resistance associated with the control electrode or grid 60. The capacitance to be considered will include all of the effective capacitance from the control electrode 60 to ground and must include capacitor 68, capacitor 56, capacitor 52 and capacitor 48, including also, of course, sync input coupling capacitors 74 and 76. The frequency of circuit oscillation may then be controlled by varying the potentiometer 64 which alters the resistance between the control electrode 60 to ground. It is well known in the art that the closer the frequency of a given set of synchronizing pulses to the natural oscillator frequency, the more firmly the oscillator may be locked in with these synchronizing pulses by applying the pulses themselves to a point in the oscillator circuit. In the drawing, the synchronizing pulses are to be applied to terminal 78 which is coupled through resistance 80 and capacitor 74 to the control electrode 60. Hence, by adjusting the potentiometer 64, commonly referred to as "hold control" the frequency of multivibrator oscillation may be brought close to the frequency of the arriving sync pulses and a very stable lock in between the deflection circuit and the sync pulses may be established.

The difficulty with this basic circuit lies in that fact that should the "hold control" 64 be rotated towards minimum resistance so as to increase the multivibrator speed, the control electrode will swing in a positive direction. This will cause a negative going pulse to be developed at the anode of tube 10 which in turn is transmitted via a capacitor 29 to the control electrode of tube 12. This pulse may be large enough to drive the tube 12 to plate current cut-off and cause complete collapse of the multivibrator circuit. Cut-off in the tube 12 will remain until capacitors 14 and 29 have sufficiently discharged to ground. In some instances, the recovery may be quite long, thereby making this collapsing effect undesirable.

According to the present invention this undesirable collapsing effect may be corrected by providing a corrective circuit path from the input circuit of the second tube to the input circuit of the first tube. In Figure 1, such a path is provided at 82 which couples the tap between resistors 38 and 39 to the control electrode 60 of tube 10 via the capacitor 68. The corrective action of the present invention may be explained as follows:

When the control electrode 60 swings in a positive direction (as a result of reducing the resistance of the "hold control" 64) and the negative blocking pulse appears at the grid 37 of tube 12, a part of this negative blocking pulse is fed back to the grid 60. If, now, the amplitude of the fed back negative going pulse is large enough it will counteract or neutralize the positive going swing of the grid 60, and thereby prevent collapse of the deflection circuit.

The embodiment of the present invention shown in Figure 2 is based upon the same circuit shown in Figure 1 and similar circuit elements are given like index numerals. In Figure 2, however, the feedback from the second tube to the first tube is accomplished via the circuit path 84 which is again connected between control electrode 37 of tube 12 and the control electrode 60 of tube 10. Instead of using a tapped resistance in the grid circuit of tube 12, resistor 86 is placed in series with the corrective feedback capacitor 88. The circuit action of Figure 2 is, of course, identical to that of Figure 1; namely, as the control electrode 37 of tube 12 tends to go negative beyond the cut-off in response to the "hold control" adjustment, the negative going pulse fed back to grid 60 counteracts the positive swing of the grid 60 which initiated the undesirable negative going swing at the grid 37.

It will be understood that although the present invention has been illustrated in connection with a specific form of multivibrator or relaxation oscillator circuit, it is equally applicable to other forms of oscillator circuit of this general variety. Moreover, the present invention is not restricted to the use of a capacitor coupled from the control electrode of one tube to the control electrode of another tube. It is obvious a corrective influence could be applied to the grid 60 of tube 10 by other means such as for example a transformer coupled with the tube 12. Finally, it is to be understood that although the present invention finds most useful application to multivibrator circuits involving more than one tube it may, under certain circumstances be advantageous to apply its principles in the design and construction of the well known single tube relaxation oscillator commonly known as a "blocking" oscillator. The "blocking" oscillator is shown by way of example in an article entitled "Linearizing Circuits for Video Deflection" by Seymour D. Uslan, page 26 of the "Radio Electronics Magazine" for January 1951.

Having thus described my invention, what is claimed is:

1. In an electron oscillator circuit, an electron discharge tube having at least an anode, cathode and control electrode, a resistive portion of a time constant circuit connected from said control electrode to said cathode, an output circuit connected from said anode to said cathode and including a source of biasing potential, coupling means having a substantially linear amplitude response connected between said output circuit and said time constant circuit for regeneratively feeding back electrical variations appearing in said output circuit to said time constant circuit, means included in said time constant circuit for changing the time constant value thereof, and a separate circuit consisting of an impedance connected from said output circuit directly to the resistive portion of said time constant circuit.

2. In an electron oscillator circuit, an electron discharge tube having at least a cathode, anode, and control electrode, a datum potential terminal, a connection from said cathode to said datum terminal, a variable resistance connected from said control electrode to said datum terminal, an output circuit connected from said anode to said cathode, said output circuit including a source of positive biasing potential for said anode, positive feedback means connected from said output circuit to said control electrode whereby to produce oscillation in said discharge tube and a separate capacitor connected solely from said output circuit to said control electrode.

3. In an electron oscillator circuit, an electron discharge tube having at least an anode, cathode and control electrode, a datum potential terminal, a connection from said cathode to said datum terminal, a resistance capacitance time constant circuit connected from said control electrode to said datum terminal, said time constant circuit having a variable resistance component whereby to allow adjustment of the value of said time constant circuit, an output circuit connected between said anode and said cathode, positive feedback means connected between said output circuit and said control electrode, said positive feedback means including at least a portion of said time constant circuit whereby to produce oscillation in said discharge at a frequency governed by the value of the said time constant circuit, and a separate capacitive circuit solely connected between a point on said output circuit to a point on said time constant circuit.

4. In a sawtooth waveform generating circuit, the combination of, an electron discharge tube having at least an anode, cathode, and control electrode, a datum potential terminal, a connection from said cathode to said datum potential terminal, a time constant circuit connected between said control electrode and said datum potential terminal, said time constant circuit including variable resistance path between said control electrode and said datum potential terminal, a positive power supply terminal referenced with respect to said datum potential terminal, a resistance connected between said anode and said positive power supply terminal, a sawtooth charging capacitor connected from said anode to said datum potential terminal, phase inverting coupling means connected between said anode and said control electrode for establishing regeneration in said discharge tube so as to periodically allow charge and discharge of said sawtooth capacitor in accordance with respective periods of non-conduction and conduction in said discharge tube, the frequency of said charge and discharge being determined by the value of said time constant circuit, and negative feedback means connected from said anode to said control electrode for stabilizing said oscillator.

5. Apparatus according to claim 4 wherein said negative feedback means comprises a capacitance connection between said anode and said control electrode.

6. In an electromagnetic cathode ray beam deflection circuit the combination of, a first and a second electron discharge tube each having at least an anode, cathode and control electrode, an input and an output circuit for each of said discharge tubes, the input circuit for said first discharge tube including a time constant circuit, the output circuit of said first discharge tube including sawtooth charging and discharging circuit, coupling means connected from the output circuit of said first tube to the input circuit of said second tube, an electromagnetic deflection yoke feeding means connected in the output circuit of said second tube, a positive feedback circuit connected from the output circuit of said second tube to the input circuit of said first tube for producing relaxation oscillation between said two tubes and an impedance connected from input circuit of said second tube to the input circuit of said first tube.

7. Apparatus according to claim 6 wherein said impedance connected from said second tube circuit to said first input circuit is a capacitance.

8. Apparatus according to claim 6 wherein said second tube input circuit includes a voltage divider circuit connected between said control electrode and said cathode of said second electron discharge tube and wherein said impedance connected from said second input circuit to said first tube input circuit comprises a capacitor connected between a point on said voltage divider system and said first tube control electrode.

9. Apparatus according to claim 6 wherein said impedance connecting said second tube input circuit with said first tube input circuit comprises the series combination of a resistance and a capacitance connected between said first and second tube control electrodes.

References Cited in the file of this patent

UNITED STATES PATENTS

| | | |
|---|---|---|
| 2,093,177 | Vance | Sept. 14, 1937 |
| 2,248,975 | Faudell | July 15, 1941 |
| 2,251,851 | Moore | Aug. 5, 1941 |
| 2,358,545 | Wendt | Sept. 19, 1944 |
| 2,402,916 | Schroeder | June 25, 1946 |
| 2,443,922 | Moore | June 22, 1948 |
| 2,461,871 | Bass | Feb. 15, 1949 |
| 2,479,081 | Poch | Aug. 16, 1949 |
| 2,540,478 | Frost | Feb. 6, 1951 |
| 2,549,764 | Bartels | Apr. 24, 1951 |
| 2,562,985 | Kronenberg | Aug. 7, 1951 |